(12) United States Patent
Feng et al.

(10) Patent No.: US 8,765,259 B2
(45) Date of Patent: Jul. 1, 2014

(54) CARRIER FILM FOR MOUNTING POLISHING WORKPIECE AND METHOD FOR MAKING THE SAME

(75) Inventors: Chung-Chih Feng, Kaohsiung (TW); I-Peng Yao, Kaohsiung (TW); Lyang-Gung Wang, Kaohsiung (TW); Yung-Chang Hung, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 127 days.

(21) Appl. No.: 12/907,382

(22) Filed: Oct. 19, 2010

(65) Prior Publication Data
US 2011/0045751 A1 Feb. 24, 2011

Related U.S. Application Data

(63) Continuation-in-part of application No. 11/706,226, filed on Feb. 15, 2007, now abandoned.

(51) Int. Cl.
| | |
|---|---|
| *B24B 41/06* | (2012.01) |
| *B32B 37/12* | (2006.01) |
| *B29C 65/00* | (2006.01) |
| *B24B 19/00* | (2006.01) |
| *C09J 5/06* | (2006.01) |

(52) U.S. Cl.
USPC .......................... 428/343; 451/398; 451/460

(58) Field of Classification Search
USPC ........................................................ 428/343
See application file for complete search history.

(56) References Cited

U.S. PATENT DOCUMENTS

| | | | |
|---|---|---|---|
| 6,368,186 B1 | 4/2002 | Wu | |
| 6,976,910 B2* | 12/2005 | Hosaka et al. | 451/530 |
| 7,101,275 B2* | 9/2006 | Roberts et al. | 451/533 |
| 2005/0026552 A1* | 2/2005 | Fawcett et al. | 451/41 |
| 2005/0112354 A1* | 5/2005 | Kume et al. | 428/304.4 |
| 2008/0287047 A1* | 11/2008 | Feng et al. | 451/532 |
| 2009/0252949 A1* | 10/2009 | Feng et al. | 428/316.6 |

OTHER PUBLICATIONS

Taiwanese Office Action dated Nov. 2, 2010 for 096105608, which is a corresponding application that cites US6368186.

* cited by examiner

*Primary Examiner* — Callie Shosho
*Assistant Examiner* — Cheng Huang
(74) *Attorney, Agent, or Firm* — WPAT, P.C.; Anthony King; Kay Yang

(57) ABSTRACT

The present invention relates to a carrier film for mounting a polishing workpiece. The carrier film comprises a surface substrate and a buffer substrate. The surface substrate consists of first elastomer, the first elastomer comprising a plurality of first holes; wherein the first holes have a drop shape, and each of the first holes has an opening. The buffer substrate consists of second elastomer, the second elastomer comprising a plurality of second holes. The surface substrate and the buffer substrate are adhered with adhesive comprising the first or the second elastomer. A method for making the carrier film is also provided. When polishing, the carrier film provides a good buffer property to conduct and release down force applied on the polishing workpiece.

10 Claims, 5 Drawing Sheets

CARRIER FILM FOR MOUNTING POLISHING WORKPIECE AND METHOD FOR MAKING THE SAME

This application is a continuation-in-part of U.S. patent application Ser. No. 11/706,226 filed Feb. 15, 2007, now abandoned.

BACKGROUND OF THE INVENTION

1. Field of the Invention

The present invention relates to a carrier film for mounting a polishing workpiece and a method for making the same, and more particularly, to a carrier film for mounting a polishing workpiece and a method for making the same which are used in the chemical mechanical polishing (CMP) process.

2. Description of the Related Art

Polishing generally refers to a wear control for a preliminary coarse surface in the process of chemical mechanical polishing, which makes the slurry containing fine particles evenly dispersed on the upper surface of a polishing pad, and at the same time places a polishing workpiece against the polishing pad and then rubs the polishing workpiece repeatedly with a regular motion. The polishing workpiece may be objects such as a semiconductor, a storage medium substrate, an integrated circuit, an LCD flat-panel glass, an optical glass and a photoelectric panel. During the polishing process, a carrier film must be used for carrying and mounting the polishing workpiece, and the quality of the carrier film directly influences the polishing effect of the polishing workpiece.

FIG. 1 shows a schematic view of a polishing device with a conventional carrier film. The polishing device 1 includes a lower base plate 11, a carrier film 12, a polishing workpiece 13, an upper base plate 14, a polishing pad 15 and slurry 16. The carrier film 12 is adhered to the lower base plate 11 through an adhesive layer 17 and is used for carrying and mounting the polishing workpiece 13. The polishing pad 15 is mounted on the upper base plate 14.

The operation mode of the polishing device 1 is as follows. First, the polishing workpiece 13 is mounted on the carrier film 12, and then both the upper and lower base plates 14 and 11 are rotated and the upper base plate 14 is simultaneously moved downward, such that the polishing pad 15 contacts the surface of the polishing workpiece 13, and a polishing operation for the polishing workpiece 13 may be performed by continuously supplementing the slurry 16 and using the effect of the polishing pad 15.

FIG. 2 is a first type of the conventional carrier film. The material of the first type of the conventional carrier film is elastomer such as foamed polyurethane. The surface of the carrier film is polished to form a suede-like surface. The carrier film comprises only one substrate, and the bottom of the substrate is more solid than the upper part of the substrate. Since the thickness of the substrate is restricted, it can only provide a minor buffer effect. In a chemical mechanical polishing process, the rotated upper base plate move downward, and a down force occurs from the upper base plate through the polishing pad and is applied on the polishing workpiece. Consequently, the down force applied on the polishing workpiece fails to be conducted and released evenly, because the conventional carrier film cannot provide a proper buffer effect. Such an uneven force usually shoves the polishing workpiece and causes it to be cracked.

A second type of the conventional carrier film is developed and shown in FIG. 3. The carrier film comprises a surface substrate and at least one buffer substrate. The materials of the surface substrate and the buffer substrate are elastomer such as foamed polyurethane. The surface and buffer substrate are adhered with pressure sensitive adhesive (PSA). One embodiment of the pressure sensitive adhesive comprises a film comprising polyethylene terephthalate, for example, and has adhesive with a low fluidity on an upper side and a lower side of the film, such adhesive being known as dual-sided adhesive. The thickness of the adhesive is usually more than 20 µm. The adhesive on the upper side of the film is configured to couple to the surface substrate, and that on the lower side of the film is to couple to the buffer substrate. The surface of the carrier film is polished to form a suede-like surface. By applying the buffer substrate, the down force is conducted and released to a certain degree. However, because the hardness rates and contraction rates of the pressure sensitive adhesive, surface substrate and buffer substrate are different, the buffer effect is reduced thereby. Furthermore, the film of the pressure sensitive adhesive provides no buffer effect at all. Such factors also shove the polishing workpiece and cause it to be cracked when polishing.

SUMMARY OF THE INVENTION

The objective of the present invention is to provide a carrier film for mounting a polishing workpiece. The carrier film comprises a surface substrate and a buffer substrate. The surface substrate consists of first elastomer, the first elastomer comprising a plurality of first holes; wherein the first holes have a drop shape, and each of the first holes has an opening. The buffer substrate consists of second elastomer, the second elastomer comprising a plurality of second holes. The surface substrate and the buffer substrate are adhered with adhesive comprising the first or the second elastomer. When polishing, the carrier film provides a good buffer property to conduct and release down force applied on the polishing workpiece.

Another objective of the present invention is to provide a method for making the carrier film for mounting a polishing workpiece. The method of the present invention comprises the following steps:

(a) providing a surface substrate consisting of first elastomer, the first elastomer comprising a plurality of first holes; wherein the first holes have a drop shape, and each of the first holes has an opening, and providing a buffer substrate consisting of second elastomer, the second elastomer comprising a plurality of second holes; and (b) adhering the surface substrate and the buffer substrate with adhesive comprising the first or the second elastomer.

DETAILED DESCRIPTION OF THE INVENTION

Figure 1:
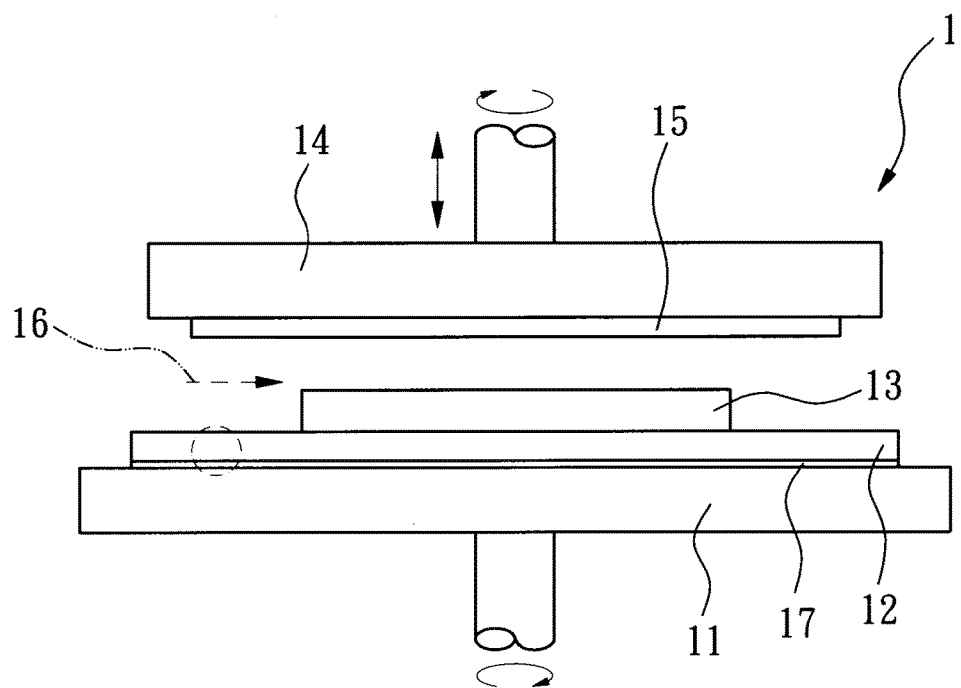
FIG. 1 shows a schematic view of a polishing device with a conventional carrier film.
Figure 2:
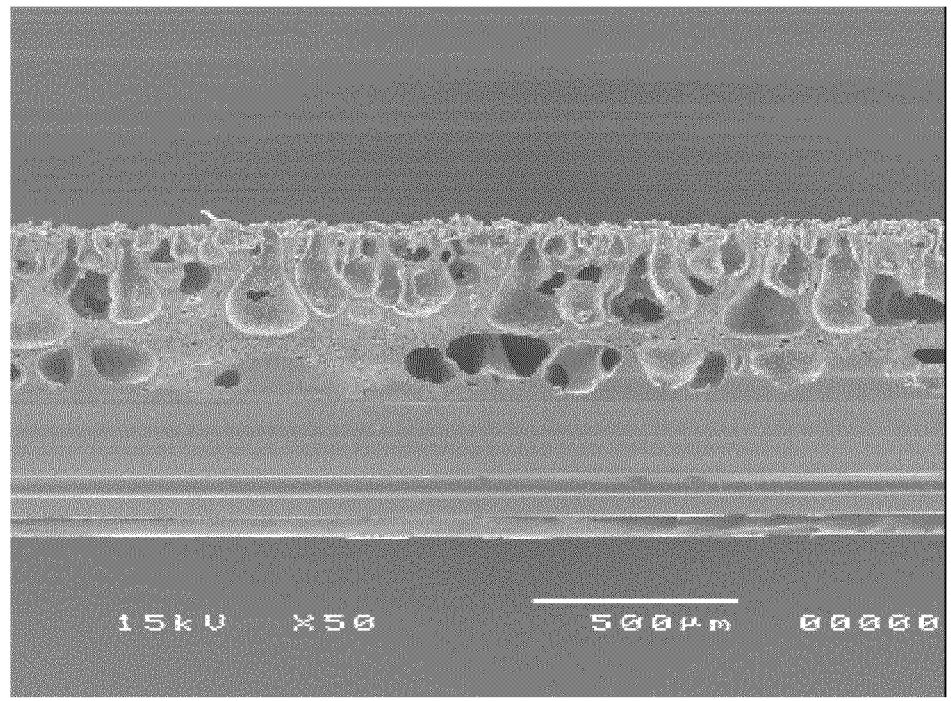
FIG. 2 shows a view under a transmission electron microscope of the first type of the conventional carrier film.
Figure 3:
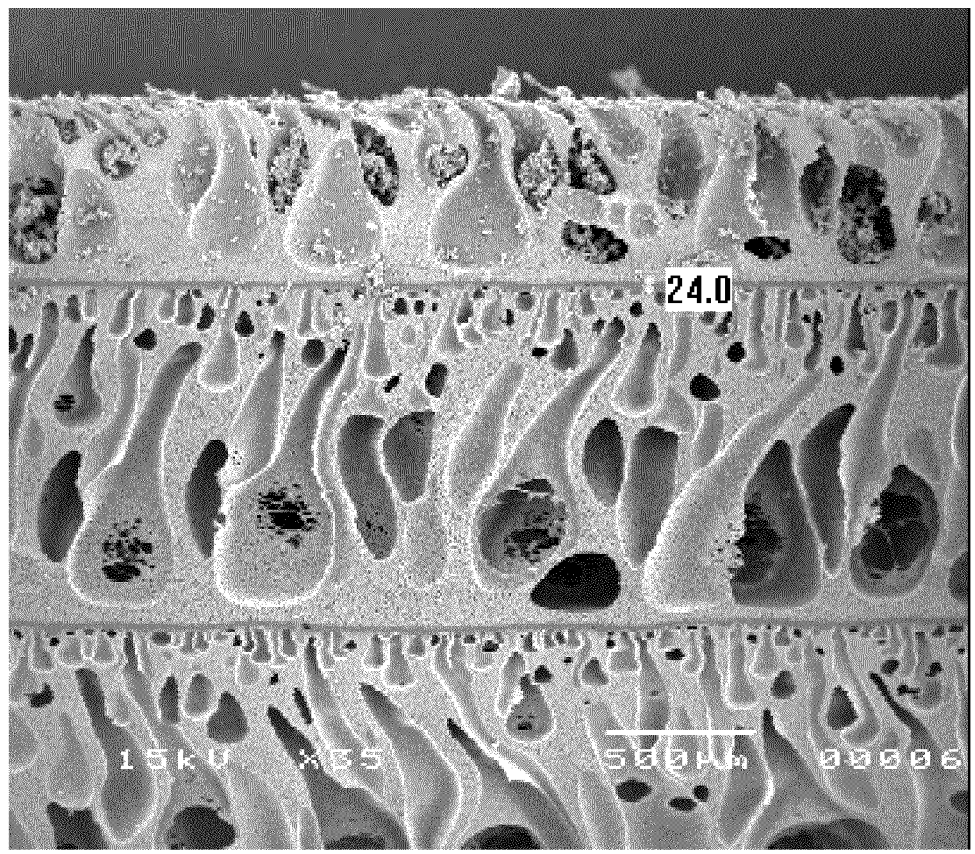
FIG. 3 shows a view under a transmission electron microscope of the second type of the conventional carrier film.

In order to obtain a carrier film for mounting a polishing workpiece that has a satisfactory buffer effect, the invention provides a novel carrier film.

The carrier film comprises a surface substrate and a buffer substrate. The surface substrate consists of first elastomer, the first elastomer comprising a plurality of first holes; wherein the first holes have a drop shape, and each of the first holes has an opening. The buffer substrate consists of second elastomer, the second elastomer comprising a plurality of second holes. The surface substrate and the buffer substrate are adhered with adhesive comprising the first or the second elastomer.

In the preferred embodiment of the invention, the drop shape of first holes comprises a wide part and a narrow part. The drop shape provides a good buffer effect to enhance the function of the buffer substrate. Preferably, the opening is formed in the narrow part to provide more friction and is designed to mount the polishing workpiece more securely.

In one preferred embodiment of the invention, the diameter of the wide part is between about 150 µm to about 180 µm. Furthermore, in one preferred embodiment of the invention, the height of the first hole is between about 300 µm to about 310 µm.

In the preferred embodiment of the invention, the size of each of the first or the second holes is even. The even size of the holes improves the buffer function.

Preferably, the second holes have a drop shape, and each of the second holes has an opening.

The second surface of the surface substrate preferably comprises a first flat surface for being adhered to the buffer substrate. The first flat surface provides a good interface to be adhered to the buffer substrate with adhesive comprising the elastomer.

In order to provide a better buffer effect, the thickness of the surface substrate is preferably between 0.05 mm to 5.00 mm. The thickness range provides an optimum buffer effect avoiding the existence of a solid bottom as observed in the conventional carrier film.

In one preferred embodiment of the invention, the buffer substrate has a second flat surface. If the second flat surface is located on an upper surface of the buffer substrate, it helps to secure the buffer substrate to the surface substrate through the adhesive comprising the first or the second elastomer. On the other hand, if the second flat surface is located on a lower surface of the buffer substrate, it helps to secure the buffer substrate and also the whole carrier film to a lower base plate of a polishing device.

The first or the second holes of the surface substrate and buffer substrate are continuous or discontinuous. The first or the second holes enable air to be distributed into the substrates and the air cooperates with the elastomer of the substrates to provide a flexible structure for releasing and conducting down forces occurring in the polishing process. The continuous first or the second holes as used herein refer to holes that connect to each other. On the other hand, the discontinuous first or the second holes as used herein refer to holes that are independent and not connected to other holes. The diameter of the holes is preferably from 0.001 µm to 1000 µm.

In the preferred embodiment of the invention, the first elastomer and the second elastomer are the same. The invention is characterized in that the materials of the surface substrate and the buffer substrate are the same, namely, the first or the second elastomer, and the adhesive comprising the elastomer is used for adhering the surface substrate and the buffer substrate. As used herein, the term "elastomer," also known as "elastic polymer," refers to a type of polymer that exhibits rubber-like qualities. When polishing, the elastomer serves as a good buffer property to conduct and release down force applied on the polishing workpiece. In one preferred embodiment of the invention, the elastomer is foam resin. As used herein, the term "foam resin" refers to a material containing thermoplastic resin and thermodecomposing foaming agent. Preferably, the elastomer includes at least one of polyurethane (PU), polypropylene (PP), polyethylene (PE) or polyvinyl chloride (PVC); more preferably, it includes polyurethane.

In one preferred embodiment of the invention, the adhesive comprising the first or the second elastomer for adhering the surface substrate and the buffer substrate is adhesive selected from the group consisting of single-part adhesive, two-part adhesive and wet solidification adhesive. The adhesive is able to penetrate into the surfaces of the surface substrate and buffer substrate and to adhere these two substrates tightly. Furthermore, the elastomer in the adhesive has the same hardness rate and contraction rate as the surface substrate and buffer substrate, so that the conduction and release of down force occurring in the polishing process are both improved. The single-part adhesive refers to adhesive comprising high-molecule-weight elastomer served as adhesive. The two-part adhesive refers to adhesive comprising two components that interact or cross-link with each other to achieve the adherence effect. The two-part adhesive preferably comprises the elastomer and polyisocyanate. The wet solidification adhesive, also known as moisture curable adhesive, refers to adhesive where the elastomer's units cross-link to each other depending on the moisture in the air. The thickness of the adhesive for adhering the surface substrate and the buffer substrate is preferably less than 1 µm. The thin adhesive provides an excellent interface between the surface substrate and buffer substrate. In another aspect, the stress of the adhesive for adhering the surface substrate and the buffer substrate is from 5 kg/cm$^2$ to 500 kg/cm$^2$.

The adhesive for adhering the surface substrate and the buffer substrate can be applied in several manners. In one preferred embodiment of the invention, the first or the second elastomer for adhering the surface substrate and the buffer substrate is formed as a plurality of adhesive bumps, an adhesive film or a plurality of adhesive spots. The adhesive is not only able to adhere these two substrates, but also able to provide a proper buffer effect.

The invention also provides a polishing device comprising
    a base plate;
    the carrier film as mentioned above adhered to the base plate; and
    a polishing workpiece mounted by the carrier film.

The invention also provides a method for making a carrier film for mounting a polishing workpiece, comprising the following steps of:
  (a) providing a surface substrate consisting of first elastomer, the first elastomer comprising a plurality of first holes; wherein the first holes have a drop shape, and each of the first holes has an opening, and providing a buffer substrate consisting of second elastomer, the second elastomer comprising a plurality of second holes; and
  (b) adhering the surface substrate and the buffer substrate with adhesive comprising the first or the second elastomer.

The manner of adhering the surface substrate and the buffer substrate varies according to the form of the adhesive. The adhesive for adhering the surface substrate and the buffer substrate is preferably applied on at least one surface of the surface substrate and the buffer substrate by coating, spraying or scraping.

In one preferred embodiment of the invention, coating the adhesive is performed with a wheel with 10 meshes to 800 meshes. The adhesive is applied on at least one surface of the surface substrate and the buffer substrate by the wheel and formed as adhesive bumps, thus avoiding excess adhesive.

In one preferred embodiment of the invention, spraying the adhesive is performed with a nozzle with a hole number between 1 and 10,000, and the hole size is between 1 μm to 1000 μm. The adhesive is applied on at least one surface of the surface substrate and the buffer substrate by the nozzle to form an adhesive thin film or spots, thus avoiding excess adhesive.

In one preferred embodiment of the invention, scraping the adhesive is performed with a blade. The adhesive is applied on at least one surface of the surface substrate and the buffer substrate by the blade to form an adhesive thin film, thus avoiding excess adhesive.

After applying the adhesive, the surface substrate and the buffer substrate are adhered. The surface substrate and the buffer substrate are preferably adhered at a pressure from 0 kg/cm² to 10 kg/cm². In another aspect, the surface substrate and the buffer substrate are adhered at a temperature from 0° C. to 300° C.

If necessary, the step (b) according to the invention further comprises a curing step. In some cases, the adhesive needs the curing step to solidify and form the bonding. The condition and manner of the curing step varies according to the adhesive used.

The following Examples are given for the purpose of illustration only and are not intended to limit the scope of the present invention.

Example

Surface Substrate:
Polyurethane (as elastomer) in dimethylformamide (as solvent) was coated on releasing paper and then put into a curing solution comprising water to mold the elastomer and form a surface substrate comprising holes.

Surface Processing:
The surface substrate was subjected to a polishing process to form a suede-like surface.

Buffer Substrate:
Polyurethane (as elastomer) in dimethylformamide (as solvent) was coated on releasing paper and then put into a curing solution comprising water to mold the elastomer and form a buffer substrate comprising holes.

Adhering:
After removing the releasing paper from the surface substrate and buffer substrate, the surface of the buffer substrate was coated with two-part polyurethane adhesive with a wheel with 150 meshes. The buffer substrate was dried and attached to the surface substrate at 65° C. and 6.0 kg/cm². The substrates were then cured at 45° C. for 48 hours to form the carrier film.

Figure 4:
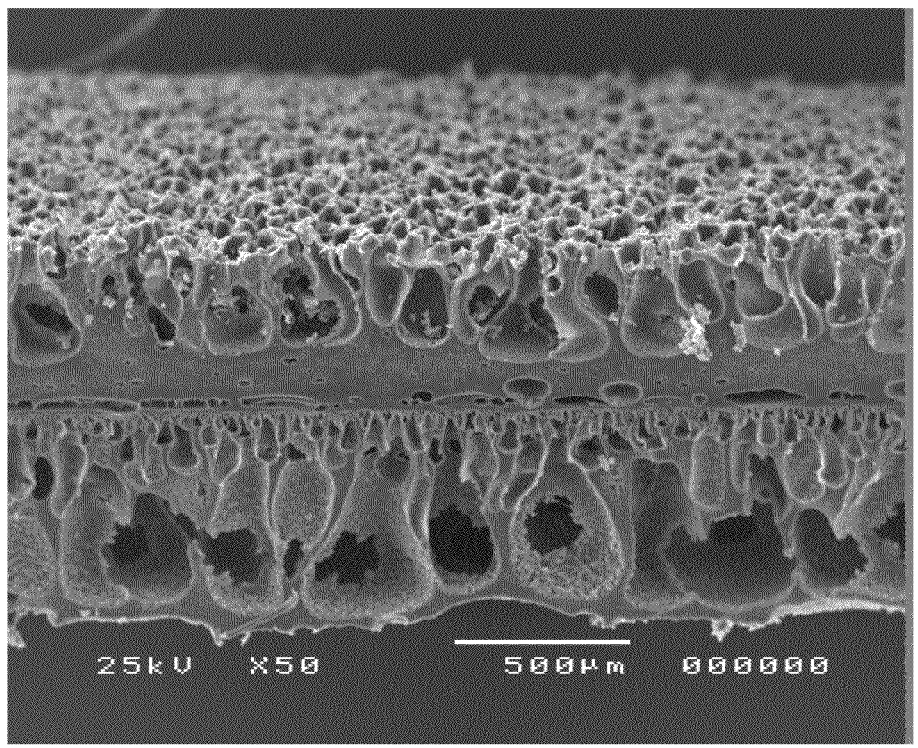
FIG. 4 shows a view (50×) under a transmission electron microscope of the carrier film of the Example.
Figure 5:
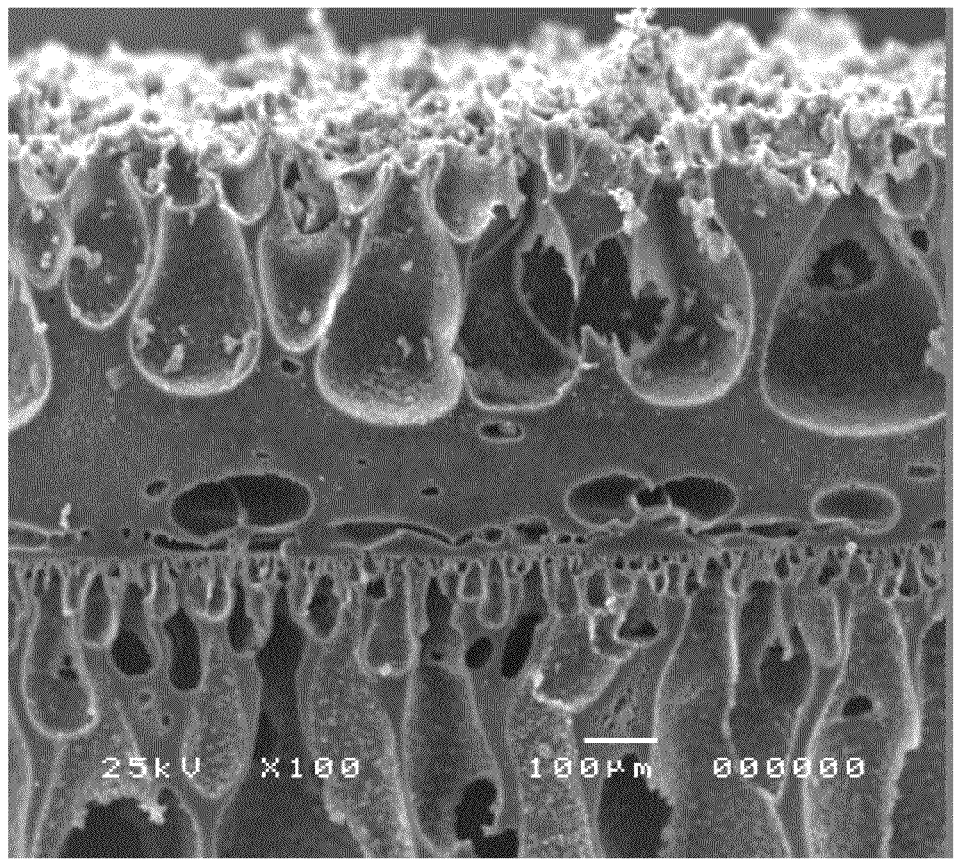
FIG. 5 shows a view (100×) under a transmission electron microscope of the carrier film of the Example.

The carrier film was observed under a transmission electron microscope and shown in FIG. 4 (50×) and FIG. 5 (100×). Referring to FIGS. 4 and 5, the thickness of the adhesive polyurethane is less than 1 μm.

While several embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A polishing device comprising:
a base plate;
a carrier film adhered to the base plate for mounting a polishing workpiece in a process of chemical mechanical polishing, comprising:
a surface substrate consisting of first elastomer, the first elastomer comprising a plurality of first holes; wherein the plurality of first holes have a drop shape, and each of the plurality of first holes has an opening,
a buffer substrate consisting of second elastomer, the second elastomer comprising a plurality of second holes;
wherein the surface substrate and the buffer substrate are adhered with adhesive comprising the first or the second elastomer;
wherein the first elastomer and the second elastomer are the same and are polyurethane;
a polishing workpiece mounted by the carrier film; and
a polishing pad placed against the polishing workpiece and polishing the polishing workpiece in the process of chemical mechanical polishing.

2. The polishing device as claimed in claim 1, wherein the drop shape of the plurality of first holes comprises a wide part and a narrow part, and the opening is formed in the narrow part.

3. The polishing device as claimed in claim 1, wherein the size of each of the plurality of first holes or the plurality of second holes is even.

4. The polishing device as claimed in claim 1, wherein the plurality of second holes have a drop shape, and each of the second holes has an opening.

5. The polishing device as claimed in claim 1, wherein the thickness of the surface substrate is between 0.05 mm and 5.00 mm.

6. The polishing device as claimed in claim 1, wherein the plurality of first holes or the plurality of second holes are continuous.

7. The polishing device as claimed in claim 1, wherein the diameter of the plurality of first holes or the plurality of second holes is from 0.001 μm to 1000 μm.

8. The polishing device as claimed in claim 1, wherein the adhesive comprising the first or the second elastomer for adhering the surface substrate and the buffer substrate is selected from the group consisting of single-part adhesive, two-part adhesive comprising the elastomer and polyisocyanate and wet solidification adhesive.

9. The polishing device as claimed in claim 1, wherein the thickness of the adhesive for adhering the surface substrate and the buffer substrate is less than 1 μm.

10. The polishing device as claimed in claim 1, wherein the adhesive comprising the first or the second elastomer for adhering the surface substrate and the buffer substrate is formed as a plurality of adhesive bumps, an adhesive thin film or a plurality of adhesive spots.

* * * * *